Jan. 11, 1955
C. S. BROWNLEE
2,699,349
GASKET
Filed Sept. 23, 1952
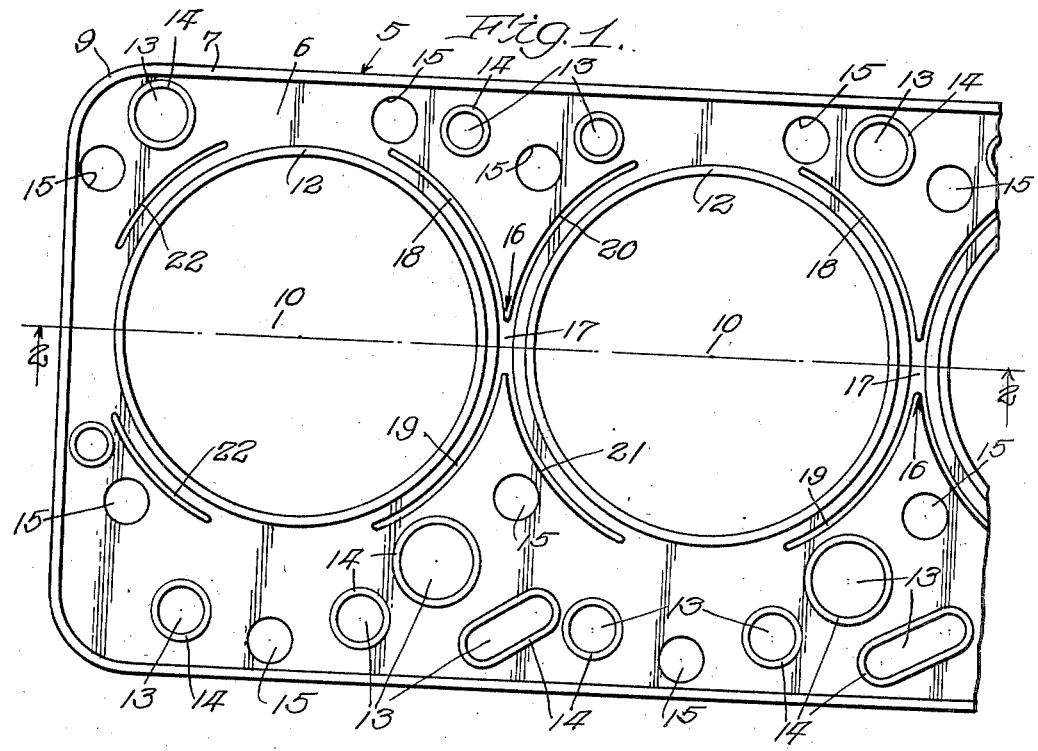
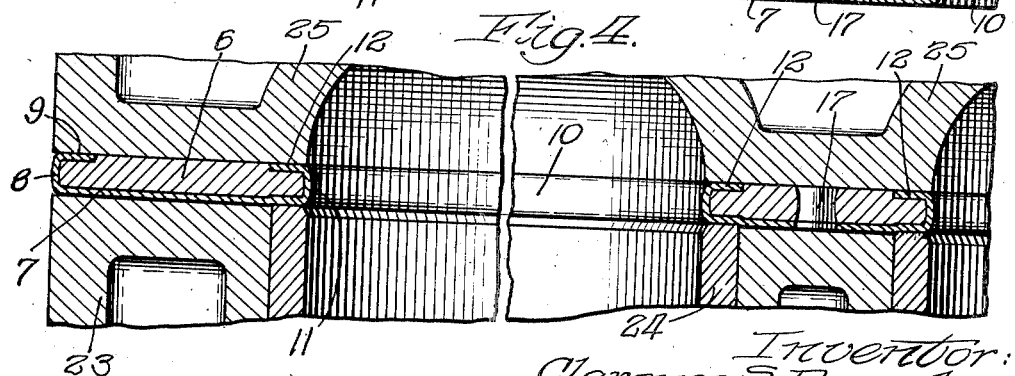
Inventor:
Clarence S. Brownlee,
By Schroeder, Merriam,
Hofgren & Brady, Attys.

United States Patent Office 2,699,349
Patented Jan. 11, 1955

2,699,349

GASKET

Clarence S. Brownlee, Highland Park, Ill.

Application September 23, 1952, Serial No. 311,035

7 Claims. (Cl. 288—32)

This invention relates to a cylinder head gasket for an internal combustion engine, and in particular it relates to a gasket which is provided with stress relief slots to make the gasket more flexible and take up "creep."

Heavy duty truck engines, and large marine and railway locomotive diesel engines are commonly made with what is known as a sleeve cylinder construction in which the interior of the motor block is open, and the cylinder walls are provided by separate cylinder sleeves which are inserted in the motor block. In order to avoid the possibility that a cylinder sleeve will be mounted so that its top surface is below the top of the block, and to assure good gasket crush at the cylinder margins, it is customary to permit the sleeve to project a short distance above the block. Most manufacturers of sleeve type engines recommend that the sleeve project a few thousandths of an inch above the level of the motor block. However, it is perfectly obvious that it is not possible to adjust the projection of the cylinder sleeves so that all are identical, and in fact the projection of adjacent sleeves may differ by one or two thousandths of an inch.

The fact that the cylinder head surface is uneven due to the sleeve projection makes the sealing of engines of this type extremely difficult. There may be 2/1000" difference in level between two adjacent cylinder sleeves which have their adjacent edges less than ½" apart, and a gasket which is rigid enough to withstand the heavy pressures generated in such heavy duty engines will not bend sufficiently over the small distance between the adjacent cylinder sleeves to provide a good seal on both sleeves. As a result it is often necessary to adjust and readjust the sleeve projection a number of times before a completely leakproof seal is obtained. To pull down and adjust a heavy duty engine, whether gas or diesel, involves considerable expense so that it becomes very important to provide a gasket which will seal the cylinder head against leakage with absolute certainty, even though the cylinder sleeves are at different levels.

Furthermore, in very high compression engines which are quite long, as is true of some of the modern six cylinder and straight eight automobile engines, the length of the gasket causes a substantial and uneven creepage, or "scrubbing," as the gasket heats differentially with continued motor operation; and it is necessary to minimize gasket "creep," or "scrub."

The principal object of this invention, therefore, is to provide an all metal cylinder head gasket for heavy duty internal combustion engines which is sufficiently flexible to provide a positive seal against leakage between the motor block and cylinder head, particularly under the adverse conditions encountered in sleeve type engines.

A further object is to provide a gasket which has stress relief slots which break up the continuity of the gasket body between cylinder openings so as to minimize the tendency of the gasket to "creep," or "scrub."

The invention is illustrated in a preferred embodiment in the accompanying drawings in which:

Fig. 1 is a plan view of a gasket embodying the invention;

Fig. 2 is a section taken as indicated along the line 2—2 of Fig. 1;

Fig. 3 is a greatly enlarged fragmentary sectional view of the gasket; and

Fig. 4 is a fragmentary sectional view similar to Fig. 3 showing the gasket in place and under compression from the cylinder head.

Referring to the drawings in greater detail, the gasket preferably comprises a two-ply body member, indicated generally at 5, which has a lamina of malleable metal 6 and a second lamina of hard metal 7 which is about one-third as thick as the lamina of malleable metal. As best seen in Fig. 3, the lamina of hard metal is turned at its margin to form a side wall 8 and is flanged over the soft metal lamina 6 at 9 so that the margin of the soft metal lamina 6 is entirely surrounded by the hard metal. A similar construction is found at the margins of the cylinder openings 10 of the gasket, where the hard metal lamina 7 is turned to form an annular wall 11 having an annular flange 12 which embraces the margin of the soft lamina 6. A similar construction may be employed at the water holes 13 of the gasket, but to simplify the making of the rims 14 for the water holes it is common to use separate grommets which are of substantially thinner stock than the hard lamina 7, the grommets being flanged over both at the top and bottom of the gasket body 5. The gasket is also provided with the conventional stud holes 15 to receive the mounting studs for the cylinder head.

Positioned between each pair of adjacent cylinder openings 10 is a stress relief slot, indicated generally at 16, which, as best seen in Fig. 1, has a central slot portion 17 which is substantially centered in the space between the cylinder openings 10 and which has arcuate branches 18, 19, 20 and 21 which extend from its ends substantially parallel to the margins of the adjacent cylinder openings 10. The aforesaid branches extend about one-third of the way around the perimeter of the cylinder openings 10, principally so that their end portions may be positioned between the cylinder openings 10 and the adjacent water holes 13. In some cases it may be desirable to also provide arcuate stress relief slots 22 which are positioned between the corners of the gasket body 5 and the cylinder opening 10 nearest said corners, to relieve the stress between the part of the gasket at the margin of the cylinder opening and the part surrounding the nearest water hole.

As best seen in Fig. 3 when the gasket is first formed the flanges 9 and 12 which embrace the soft lamina 6 may project a substantial distance above the surface of said soft lamina; but as seen in Fig. 4, when the gasket 5 is applied to the motor block 23 of an internal combustion engine having cylinder sleeves 24 and the cylinder head 25 is drawn down tight by means of its mounting studs it crushes the flanges 9 and 12 into the body of the soft metal lamina so that the gasket under compression has no projections of any sort.

The hard metal lamina 7 is preferably formed of steel while the soft metal lamina 6 is preferably dead soft, copper or 2–SO aluminum. 2–SO aluminum may readily be reduced in total thickness by as much as one-third under the pressures normally used to secure a cylinder head on the motor block of an engine, and this is ample to permit the flanges 9 and 12 of the hard metal lamina 7 to be forced flush with the surface of the soft metal lamina 6.

Although the invention is here illustrated as applied to a two-ply all metal gasket, it may equally well be applied to a one-piece metal gasket, to a gasket having several laminae, or even to a standard laminar gasket having a sheet of asbestos between two sheets of metal. The gaskets containing asbestos, however, are not very satisfactory for heavy duty engines or for any engines having a compression ratio higher than about 7–1 because they do not furnish sufficient support where the steel is turned up. On high compression engines either a one-piece metal gasket must be used, or a laminar all metal gasket.

The stress relief slots 17 with their branches 18, 19, 20 and 21, provide sufficient flexibility in the gasket body that the gasket may bend readily so as to form a perfect seal even on a sleeve type engine in which adjacent sleeves are as much as one or two thousandths of an inch off level. Furthermore, the relief slots break up the tendency of the gasket to creep or scrub and thus provide a positive seal in any type of engine requiring a gasket of substantial length. The problem of gasket creepage are greatly increased where the motor block and cylinder head are of materials having different expansion coefficients and also where the gasket contains laminae of different materials having substantially different expansion coefficients. Thus, a gasket provided with relief slots is particularly valuable under conditions such as those above mentioned. Of the metals commonly used in motor blocks, cylinder heads and gaskets, iron has the lowest coefficient of expansion, steel next higher, then aluminum and finally copper. Thus, problems of gasket scrub or creep are more severe in a motor having a cast iron or steel block combined with an aluminum head. The problem is enhanced if, as is frequently the case, a gasket containing one or more laminae of copper is interposed between a ferrous metal block and an aluminum head. A laminar gasket containing steel and aluminum or steel and copper also add to the problem of gasket creep.

The foregoing detailed description is given for clearness of understanding only and no unnecessary limitations are to be understood therefrom, as some modifications will be obvious to those skilled in the art.

I claim:

1. An all metal gasket member having at least two apertures to register with the cylinders of an internal combustion engine, said gasket member having a generally laterally extending relief slot between each two apertures, said slot being narrow in comparison to the space between the apertures and extending continuously for at least the majority of the distance between longitudinal lines projected through the most lateral points of said apertures.

2. The gasket of claim 1 which comprises a plurality of laminae of metal, one of which is very malleable.

3. The gasket of claim 1 which comprises a plurality of laminae of metal having different expansion coefficients.

4. The gasket of claim 1 which comprises a first lamina of very malleable metal and a second lamina of steel which is about one-third the thickness of the first lamina and is flanged at said apertures so that a marginal portion thereof embraces the margin of the first lamina.

5. The gasket of claim 1 in which the stress relief slot is centered in the space between two apertures and has branches extending substantially parallel to the margin of each aperture and approximately one-third of the way around each aperture.

6. The gasket of claim 1 which is provided with apertures to register with the water holes in the motor block of the engine, and stress relief slots are positioned between any cylinder aperture and an adjacent water aperture.

7. A gasket for internal combustion engines comprising: a lamina of malleable aluminum, said lamina having apertures to register with the cylinders of an internal combustion engine; a steel lamina which is about one-third the thickness of the aluminum lamina and has apertures registered with those in the aluminum lamina, said steel lamina having flanges embracing the margins of the apertures in the aluminum lamina; and a stress relief slot extending through both laminae between each pair of cylinder apertures, each slot having a portion substantially centered in the space between a pair of apertures and having branches extending substantially parallel to the margins of the apertures and about one-third of the way around each aperture.

References Cited in the file of this patent

UNITED STATES PATENTS

| | | |
|---|---|---|
| 1,748,582 | Oven | Feb. 25, 1930 |
| 1,896,795 | Kendall | Feb. 7, 1933 |
| 2,001,225 | Victor | May 14, 1935 |
| 2,034,610 | Dickson | Mar. 17, 1936 |
| 2,210,453 | Ginn | Aug. 6, 1940 |
| 2,211,247 | Victor et al. | Aug. 13, 1940 |

FOREIGN PATENTS

| | | |
|---|---|---|
| 6,243 | Great Britain | of 1893 |

OTHER REFERENCES

"The Gasket" (published by Goetze Gasket & Packing Co.), pages 1–4. (Copy in Scientific Library and Div. 52.)